(12) United States Patent
Syeda-Mahmood (10) Patent No.: US 6,178,417 B1
(45) Date of Patent: Jan. 23, 2001

(54) METHOD AND MEANS OF MATCHING DOCUMENTS BASED ON TEXT GENRE

(75) Inventor: Tanveer F. Syeda-Mahmood, Rochester, NY (US)

(73) Assignee: Xerox Corporation, Stamford, CT (US)

( * ) Notice: Under 35 U.S.C. 154(b), the term of this patent shall be extended for 0 days.

(21) Appl. No.: 09/106,544

(22) Filed: Jun. 29, 1998

(51) Int. Cl.$^7$ .................................................. G06F 17/30
(52) U.S. Cl. ........................... 707/3; 707/6; 707/515; 704/1; 700/223
(58) Field of Search ........................... 707/3–5, 6, 100, 707/515; 382/181; 700/223; 704/1–10

(56) References Cited

U.S. PATENT DOCUMENTS

| | | | |
|---|---|---|---|
| 5,438,628 | 8/1995 | Spitz et al. | 382/181 |
| 5,465,353 | 11/1995 | Hull et al. | 395/600 |
| 5,642,288 | 6/1997 | Leung et al. | 364/478.11 |
| 5,717,940 | 2/1998 | Peairs | 395/777 |
| 5,778,397 | * 7/1998 | Kupiec et al. | 707/500 |
| 5,943,670 | * 8/1999 | Prager | 707/5 |
| 6,003,027 | * 12/1999 | Prager | 707/5 |
| 6,029,167 | * 2/2000 | Evans | 707/4 |

OTHER PUBLICATIONS

Layout Recognition of Multi–Kinds of Table–Form Documents by Toyohide Watanabe, Member, IEEE Computer Society, Qin Luo, and Noboru Sugie, Manuscript received Nov. 1, 1993 and revised Aug. 10, 1994; 13 pages.
AGREP—A Fast Approximate Pattern–Matching Tool by Sun Wu and Uidi Manber, Dept. of Computer Science, University of Arizona, 9 pages; Winter 1992.

* cited by examiner

Primary Examiner—Hosain T. Alam
Assistant Examiner—Jean Bolte Fleurantin
(74) Attorney, Agent, or Firm—L. M. Ortiz; G. B. Cohen; P. E. Blair (57) ABSTRACT

A method for matching documents based on spatial layout of regions based on a shape similarity model for detecting similarity between general 2D objects. The method uses the shape similarity model to determine if two documents are similar by logical region generation in which logical regions are automatically derived from information in the documents to be matched, region correspondence, in which a correspondence is established between the regions on the documents, pose computation in which the individual transforms relating corresponding regions are recovered, and pose verification in which the extent of spatial similarity is measured by projecting one document onto the other using the computed pose parameters.

1 Claim, 10 Drawing Sheets

MEMORANDUM

TO : ALL CORPORATE AND TAX ATTORNEYS AND PARALEGALS

FROM: Julie Garcia

DATE: November 30, 1992

RE : December 1992 AFRs

---

For copies of this AFR memo or previous AFR memos, please call me at ext. 6763. If you have questions regarding the AFRs, please call Glen Kohl, ext. 4747. AFRs for December 1992:

Compounding Period

|               | Annual | Semiannual | Quarterly | Monthly |
|---------------|--------|------------|-----------|---------|
| Short-Term AFR | 4.07%  | 4.03%      | 4.01%     | 4.00%   |
| Mid-Term AFR   | 6.15%  | 6.06%      | 6.01%     | 5.98%   |
| Long-Term AFR  | 7.34%  | 7.21%      | 7.15%     | 7.10%   |

Note has a Term of:                         AFR not over 3 years . . . . . . . . . short-term rate over 3 years but
not over 9 years . . . . . . . . . mid-term rate over 9 years . . . . . . . . . . . long-term rate

Section 382 Rate

Adjusted federal long-term rate for current month         6.09%

Long-term tax-exempt rate for ownership changes
during the current month (the highest of the adjusted
federal long-term rates for the current month and the
prior two months).                                         6.09%

A:\DEC92.AFR(5P3)

FIG. 1

CONFIDENTIAL

MEMORANDUM

To: All Associates

From: The Members

Date: January 8, 1990

Re: Annual Associate Salary Adjustments

---

We have completed our 1990 associate salary review and would like to advise you of the new salary schedule which is effective January 1, 1990.

The new salaries reflect increases ranging from approximately 10.5% to approximately 27.5% depending on class. In establishing the new schedule, we took into account such factors as the client base and other economics of the Firm, the experience and productivity of our associates, compensation structures of other firms in northern and southern California, and discussions with the Associates Committee.

The new salary structure is set forth below:

| CLASS | 01/01/89 Base | 01/01/90 Base |
|-------|---------------|---------------|
| 1982  | 94,000        | 117,000       |
| 1983  | 88,000        | 112,000       |
| 1984  | 82,000        | 95,000        |
| 1985  | 75,000        | 85,000        |
| 1986  | 70,000        | 78,000        |
| 1987  | 66,000        | 73,000        |
| 1988  | 62,000        | 69,000        |
| 1989  |               | 66,000        |

Please note that the above schedule does not include compensation for several attorneys who are employed on a part-time, contract or other special basis.

Our bonuses for the fiscal year ending January 31, 1990 will be announced later this month and will be paid on January 31. Based on our current projections for the fiscal year, we anticipate that bonuses will be as follows:

FIG. 2

MEMORANDUM
To:
From:
Date:
Re:

*FIG. 3*

XEROX Internal Memo

To
Tanveer P. Syeda-Mahmood 128-29E
Yong-Qing Cheng 128-29E

From
Mark Costello

OGC/Patent
XRX2 - 20A
8*223-5006
<MCost:Roch:Xerox>

Subject
IP/952586

Date
December 14, 1995

The subject file has been established on 12/13/95 to encompass the subject matter of your invention proposal entitled "Method for Indexing Colored Surfaces in Images".

Your invention will be evaluated by the Technical Advisory Panel (TAP) which will also have the input from the Manager's Comment Form to consider. After a rating is given, I will review the entire file and make a recommendation to the Patent Committee that your invention be activated or inactivated. If activated, a formal search of the prior art will be made. If your invention is found to be patentable, then a patent application will be prepared with your assistance and circulated to interested parties for comments in due course.

If an electronic version of this Invention Proposal is available, would you kindly forward a copy to MCost:Roch:Xerox. Please include the IP/No. in the subject line.

In the meantime, if you do any additional work on this invention or if you have any further thoughts on this matter, please address this and all future correspondence related to this subject proposal to this file.

MC/jk c: Gilbert Porter 128-29E *

Attachment

* Note to Manager: Please complete the attached Manager's Comment Form and submit to Michael M. Shahin - Wbst 105 - 64C, with a copy to the assigned attorney as indicated above.

FIG. 4

XEROX  Internal Memo

To
Dorian Kermisch 128-29E

From
Mark Costello

OGC/Patent
XRX2 - 20A
8*223-5006
<MCost:Roch:Xerox>

Subject
IP/941911

Date
October 25, 1994

The subject file has been established on 10/25/94 to encompass the subject matter of your invention proposal entitled "Adaptive Threshold for Bitmap Normalization".

Your invention will be evaluated by the Technical Advisory Panel (TAP) which will also have the input from the Manager's Comment Form to consider. After a rating is given, I will review the entire file and make a recommendation to the Patent Committee that your invention be activated or inactivated. If activated, a formal search of the prior art will be made. If your invention is found to be patentable, then a patent application will be prepared with your assistance and circulated to interested parties for comments in due course.

If an electronic version of this Invention Proposal is available, would you kindly forward a copy to MCost:Roch:Xerox. Please include the IP/No. in the subject line.

In the meantime, if you do any additional work on this invention or if you have any further thoughts on this matter, please address this and all future correspondence related to this subject proposal to this file.

MC/jk c: Gilbert B. Porter, III 128-29E *

Attachment

* Note to Manager: Please complete the attached Manager's Comment Form and submit to Michael M. Shahin - Wbst 105 - 64C, with a copy to the assigned attorney as indicated above.

FIG. 5

MEMORANDUM

TO : ALL CORPORATE AND TAX ATTORNEYS AND PARALEGALS

FROM: Julie Garcia

DATE: November 30, 1992

RE : December 1992 AFRs

---

For copies of this AFR memo or previous AFR memos, please call me at ext. 6763. If you have questions regarding the AFRs, please call Glen Kohl, ext. 4747. AFRs for December 1992:

Compounding Period

|               | Annual | Semiannual | Quarterly | Monthly |
|---------------|--------|------------|-----------|---------|
| Short-Term AFR| 4.07%  | 4.03%      | 4.01%     | 4.00%   |
| Mid-Term AFR  | 6.15%  | 6.06%      | 6.01%     | 5.98%   |
| Long-Term AFR | 7.34%  | 7.21%      | 7.15%     | 7.10%   |

Note has a Term of:                     AFR not over 3 years . . . . . . . . . short-term rate over 3 years but
not over 9 years . . . . . . . . . mid-term rate over 9 years . . . . . . . . . . . long-term rate

Section 382 Rate

Adjusted federal long-term rate for current month          6.09%

Long-term tax-exempt rate for ownership changes
during the current month (the highest of the adjusted
federal long-term rates for the current month and the
prior two months).                                          6.09%

A:\DEC92.AFR(5P3)

| | |
|---|---|
| XEROX | Internal Memo |
| To | From |
| | Mark Costello |
| | OGC/Patent |
| | XRX2-20A |
| | 8*223-5006 |
| | <Mcost:Roch:Xerox> |
| Subject | Date |

MC/jk
C:
Attachment

FIG. 8

To: Xerox Intellectual Property Department
Xerox Square-020A    Rochester    NY 14644    Mail Stop XRX2-20A
Palo Alto    CA    3333 Coyote Hill Road54304    Mail Stop:    PARC
(Send original to the Intellectual Property Department and a copy to your manager.)
1    Proposal submitted by    (please use legal name)    Full First Name    Middle    Last Employee No.
Organization    (unit/Div/Dept/Section)    Electronic mail address Bldg.No./MailStop    Extension
1    Proposal submitted by    (please use legal name)    Full First Name    Middle    Last Employee No.
Organization    (unit/Div/Dept/Section)    Electronic mail address Bldg.No./MailStop    Extension
1    Proposal submitted by    (please use legal name)    Full First Name    Middle    Last Employee No.
Organization    (unit/Div/Dept/Section)    Electronic mail address Bldg.No./MailStop    Extension
*If space for additional submitters is required, please use another sheet    and attach any supplementary Comments
Manager    Electronic Mail Address    Bldg.No./Mail Stop    Name of Xerox Program and Technology Descriptive title of proposal:
Provide a brief summary or abstract of the invention, specifically pointing out the features you think are new:
Provide here    using added pages    a more detailed technical description of your invention including the advanatge(s)    and    the
problem(s) solved
By the invention    and how each is accomplished.    Please indicate the current methods or techniques used to solve the
problem(s)    and the
Deficiencies of these methods or techniques.Sketches    drawings    notebook pages    memos    or photos can
be very helpful and should be
Attached if possible.

Witnessed and understood by    Date
Submitter's signature    Date

METHOD AND MEANS OF MATCHING DOCUMENTS BASED ON TEXT GENRE

FIELD OF THE INVENTION

This invention is related to document matching based on text genre and, more particularly, to a method and system by which text genre of documents can be captured for purposes of classifying and retrieving documents.

BACKGROUND OF THE INVENTION

Figure 1:
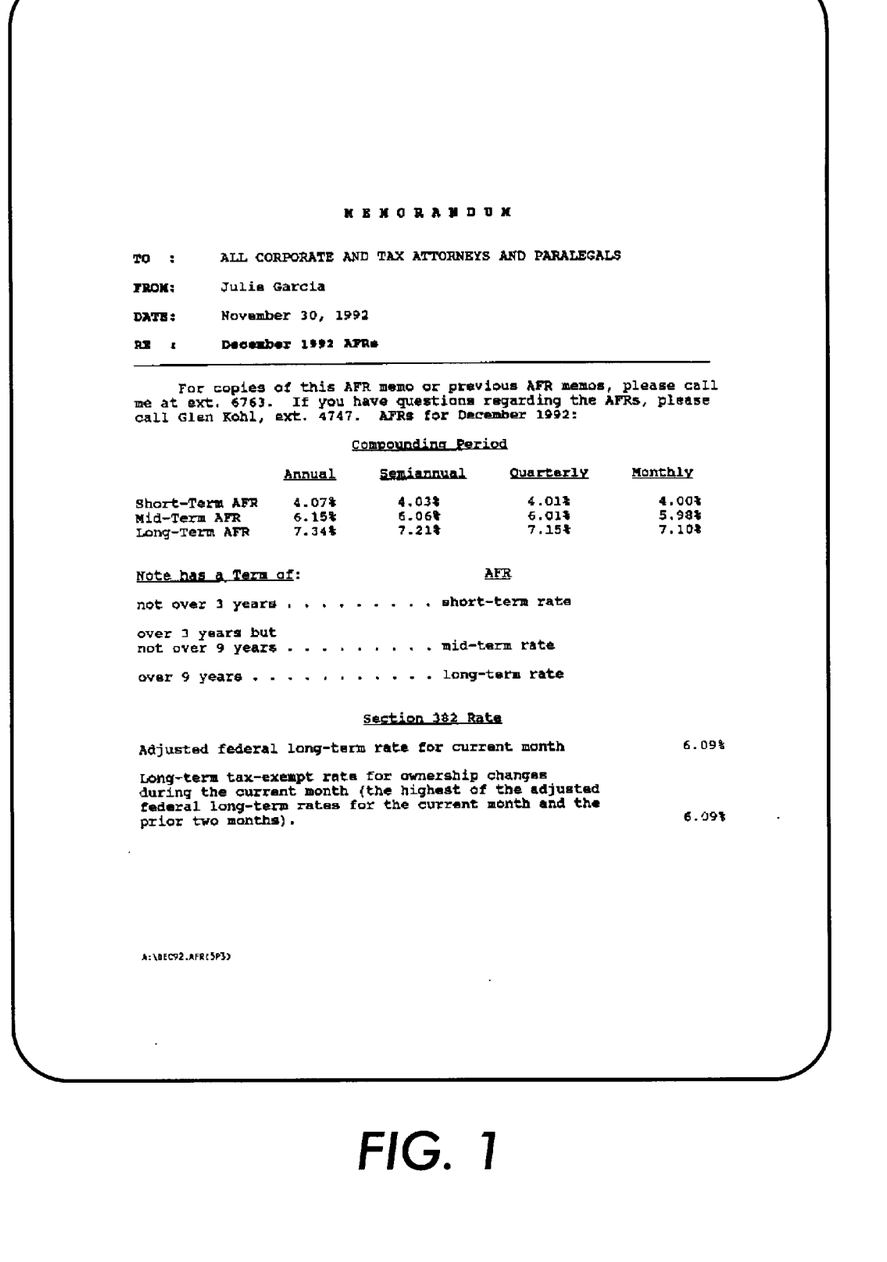
FIGS. 1 and 2 illustrate examples of documents that can be classified as internal memos through the occurrence of certain distinctive strings such as Date: From: To:, etc. occurring in a particular order.
Figure 2:
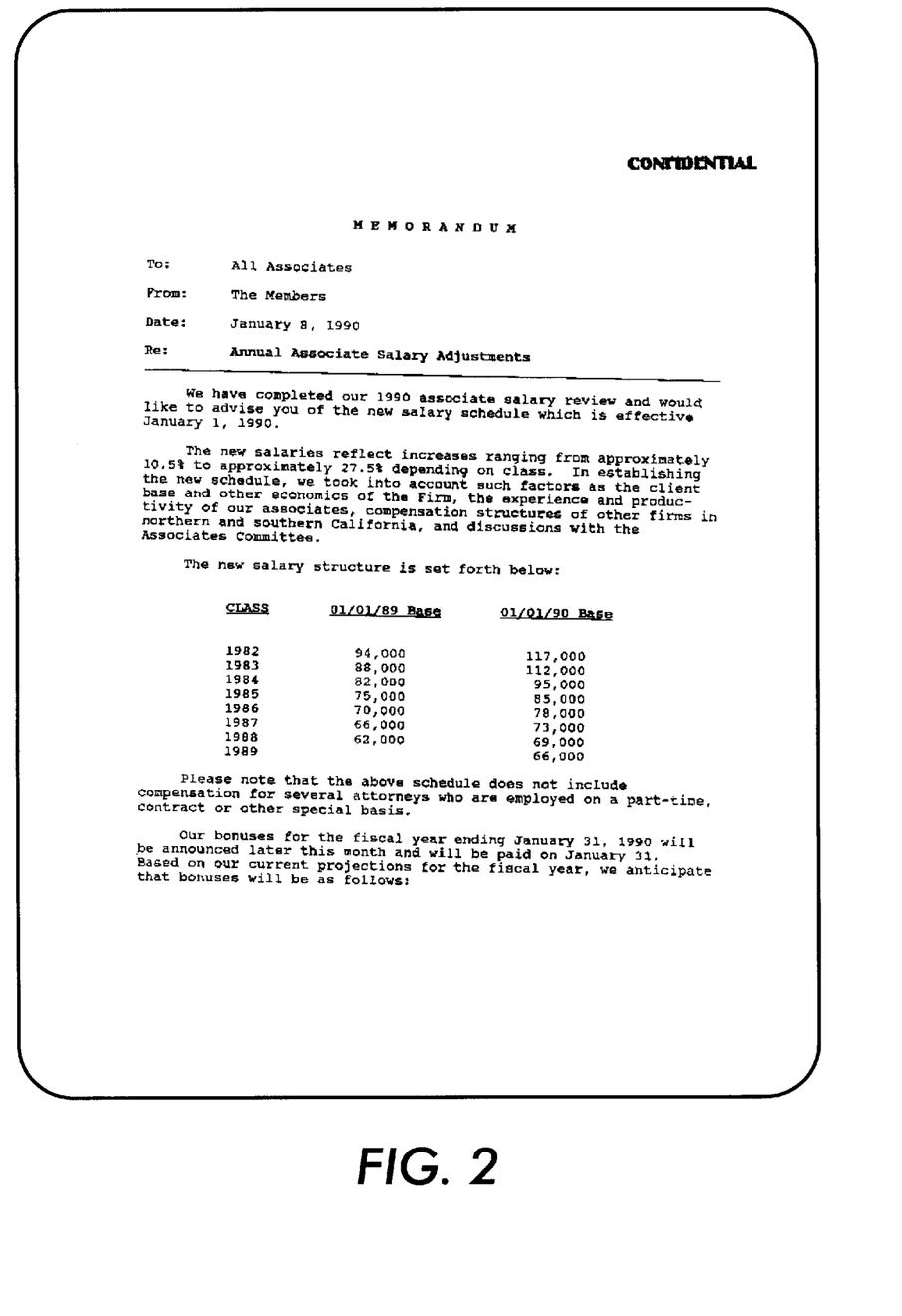

In today's world, increasing number of documents are being scanned in large quantities or are being created electronically. To maintain and manage these documents requires new methods that analyze, store and retrieve the documents. Current document management systems can support document database creation from scanned and electronic documents. They also support full-text indexing in which a document can be retrieved through all significant text keywords contained within the document. As uses of search engines are aware, text keywords or their Boolean combination typically retrieve a very large number of documents, and the relevant ones may be found only after considerable navigation through retrieved results. A search that can capture the structure of text as laid out in documents can help in narrowing down the possibility. A need for allowing more visually-based text queries has been felt, particularly in retrieving documents when text keywords are unreliably extracted (from scanned documents due to OCR errors), or retrieve too many choices for a user to select from. In such cases the intention of the user is best captured by either allowing more flexible queries making reference to a document genre or type (say, find me a "letter" from "X" regarding "sales" and "support"), or by simply pointing to an icon or example, and asking "find me a document having a similar text structure." Performing either query requires an ability to automatically derive such document genre or type information from similarity in the text layouts of documents. For example, if the user's intention is to find an internal memo document, then it may be described both by the text keywords or strings that may be found in the document, as well as their order of occurrence. FIGS. 1 and 2 illsutrate two internal memo documents, and it can be seen that they show similar keywords such as From:, To:, Date:, Re:, etc., occurring in a similar layout. All internal memo documents that show such structured text strings can also be grouped together into a document class or type and be denoted by the common structured text strings found. In such cases, the structured common text strings can be termed as a text genre. The text genre can not only be used to group documents of a database into categories, but can also improve search of document collections, by allowing the user to specify his request using a higher-level abstraction of the document type rather than through text keywords.

Deriving a text genre of a class of documents can be difficult. First, the words have to be grouped into higher level text constructs such as strings. Given a set of documents belonging to a document type or genre, determining the largest set of strings that are common to all documents of the class and occur in the same order, is an NP-complete problem for which polynomial solutions do not currently exist While text-based retrieval has been extensively studied and implemented in practical information retrieval systems, the concept of text genres and their use in document retrieval has not been attempted before. The problem of finding substring matching a query string, has also been extensively studied as string matching algorithms are employed by most text editors e.g. Emacs, Word, for finding strings in documents (algorithms behind unix substring matching utilities such as grep, egrep are algorithms like the Boyer-Moore string matching algorithm described in the book Introduction to algorithms by Cormen, Leisersen and Rivest, MIT Press, 1993. The problem of string matching has also been addressed in the context of OCR errors in string search tools such as agrep on Unix platforms (Sun Wu and Udi Manber AGREP—A Fast Approximate Pattern Matching Tool, Proceedings Winter 1992 USENIX Conference, San Francisco, 1992, pp.153–162, http://www.filou-fox-figurentheater.de/tom/agrep.html#LITERATURE). Such string matching algorithms are restricted to finding matches to query strings within documents, and to our knowledge, they have not been used to find the largest set of common strings that preserve their order of occurrence within a set of documents.

While matching based on text layout structurelgenres has not been attempted before, previous work exists on several methods of document matching based on image content. Some of these extract a symbolic graph-like description of regions and perform computationally intensive subgraph matching to determine similarity, as seen in the work of Watanabe in "Layout Recognition of Multi-Kinds of Table-Form Documents", IEEE Transactions Pattern Analysis and Machine Intelligence. Furthermore, U.S. Pat. No. 5,642,288 to Leung et al. entitled "Intelligent document recognition and handling" describes a method of document image matching by performing some image processing and forming feature vectors from the pixel distributions within the document. The following patents provide further background on various attempts of the prior art in document matching:

U.S. Pat. No. 5,438,628 to Lawrence et al. entitled "Method for matching text images and documents using character shape codes" describes a method for exact and inexact matching of documents stored in a document database including the step of converting the documents in the database to a compacted tokenized form. A search string or search document is then converted to the compact tokenized form and compared to determine if the test string occurs in the documents of the database or whether the documents in the database correspond to the test document. A second method for inexact matching of a test document to the documents in the database includes generating sets of one or more floating point values for each document in the database and for the test document. The sets of floating point numbers for the database are then compared to the set for the test document to determine a degree of matching. A threshold value is established and each document in the database which generates a matching value closer to the test document than the threshold is considered to be an inexact match of the test document.

U.S. Pat. No. 5,465,353 to Jonathan Hull et al. entitled "Image matching and retrieval by multi-access redundant hashing" describes a document matching and retrieval system where an input document is matched against a database of documents, using a descriptor database which lists descriptors and points to a list of documents containing features from which the descriptor is derived for each document. The descriptors are selected to be invariant to distortions caused by digitizing the documents or differences between the input document and its match in the document database. An array of accumulators is used to accumulate votes for each document in the document database as the descriptor base is scanned, wherein a vote is added to an accumulator for a document if the document is on the list as having a descriptor which is also found in the input document. The document which accumulates the most votes is returned as the matching document, or the documents with more than a threshold number of votes are returned.

U.S. Pat. No. 5,717,940 to Peairs entitled "Method of selecting a target document using features of an example page" describes method where an example page taken from each document in a document database is processed by a page processor to yield an iconic representation for the example page. To form the iconic representation, the example page is segmented into text regions, line art regions, photograph regions, etc., and each region is reduced in a manner appropriate for that image type. Text is replaced with a block font and reduced, while graphics are reduced in level and/or spatial resolution). The reduced regions of the example page are then reassembled into the icon. When multiple icons are printed on a guide page, a user can visually identify the icon for an example page of a target document and supply the icon, or a label for the icon, to a document retrieval system, which selects candidate matching documents from the document database. For simplified processing characters can be blocked and words formed into solid line segments with lengths proportional to word lengths.

Disclosures of all of the patents and references cited and/or discussed above in this Background are incorporated herein by reference.

SUMMARY OF THE INVENTION

A text genre is the longest common sequence of invariant text strings among documents in a class or cluster. The commonality in text content is captured through the invariant text strings, while their ordering is captured by their position in the sequence. Text genres are particularly useful for capturing the field label information in documents such as memos or forms where certain text strings occur repeatedly in all the documents of the class.

The computer-based method disclosed herein automatically extracts text genre from a set of documents of a class to serve as a compact description for the class. It also provides a way to determine if a new document belongs to the document class characterized by a text genre, thereby allowing documents that have the same type of structural text information to be retrieved. Such a capturing of text-based similarity extends the capability of current document management systems by allowing more advanced text-based indexing than is possible by a Boolean combination of text keywords.

The method derives text genre from a collection of documents. It is also a method of document matching based on text genre. The text genre of a collection of documents is defined as the largest set of strings that occur in all the documents in the same reading order. A method is given to extract the text genre given a training sample of documents. A method is also presented to verify if a given document belongs to a text genre, and hence to the class of documents typified by the text genre.

The concepts of document matching and document classification is tested by building a document system that allows users to find the nearest text genre for a query document.

The document matching method described here can be suitably combined with other text-based retrieval methods to enhance the capability of current document management systems. Such document management systems can provide enhanced search features in applications such as office environments, medical databases, etc.

DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown:

FIG. 9 shows the text genre of the collection represented by FIG. 7;

DETAILED DESCRIPTION OF THE INVENTION

This invention disclosed here is a method of extracting text genre of a class of documents, and a method of document matching based on text genres. The text genre of a collection of documents is defined as the largest set of strings that occur in all the documents in the same reading order. The documents for deriving text genre can be either electronic documents to begin with, or scanned documents. Electronic documents are assumed to be in ASCII text form. If they are not in ASCII format, they can be converted to such a format. Thus a latex document can be used as it is (being in ASCII text form), while a Word document may have to be saved as a plain text file. Scanned documents are also assumed to be converted to ASCII text through standard OCR algorithms such as Xerox TextBridge™. In either case, the method does not assume that the document is free of spelling errors (due to OCR errors or typos). A string in these documents is a set of words in the document, separated by one or more blank spaces, carriage returns, and sentence delimiters such as '.', ':', ';'. Formally, this can be denoted by the grammar:

<string>=(<word><blank >$^+$)$^+$<delim>, where <word>→char$^+$, and <delim>→<blank> | <CR> |; |: |. | . . .

If we denote a document D by the set of strings contained in it in their reading order (i.e. order of occurrence in the document), then the document string set can be denoted by a sequence
D=<s1,s2, . . . sk>, where k is the number of strings in the document. Given two documents string sequences, (D1, D2)=(<s1,s2 . . . sk>,<t1,t2, . . . tl>) of length k and l respectively, the largest set of strings that are common to both documents and occur in the same reading order is given by the longest common subsequence of (D1,D2). The following example illustrates longest common subsequence. If we denote the strings in the document by symbols, then the LCS of a document D1=<ABCBDAB> and D2=<BDCABA> is <BCBA> or <BCAB>. The LCS of two sequences obeys the principle of optimality, and it can be found using dynamic programming. An algorithm for finding the LCS of a pair of sequences is described in Rivest et al., which takes O(mn) time where m and n are the lengths of the strings.

The LCS of a set of sequences D1,D2, D3, . . . etc. can similarly be defined as the longest common subsequence of all the sequences D1,D2,D3, . . . . However, a straightforward way of finding the LCS of a set of sequences may take exponential time $O(m^P)$ for a set of p sequences.

Generation of Text Genre from a Training Set of Documents

A simple method of discovering text genre of a class of documents is now described. Here we assume that the documents used for training for a text genre have been correctly classified and verified by a human operator. The method is as follows:

1. Use two training documents D1, D2 initially, and extract strings from the documents. This can give several hundred strings per document
2. For each string in D1, find matches in strings of D2. This matching is determined using agrep, an approximate string matching algorithm cited in the prior art section. Here allowance is made for substitution errors for scanned documents to model OCR errors. The possible substitute characters are determined by modeling the common OCR errors and defining a confusion class for each character. For example, the confusion class of character I is (I, 1, 1), meaning the character I can be recognized as I or mis-recognized as the number 1 or the small case letter 1. Using this type of string matching the word 'AIMS' can be matched to word 'alms'.
3. The strings of D1 that found a match in D2 are used to form the first string sequence using their order of occurrence. Similarly, the strings of D2 that found a match to a string in D1 are used to form a sequence using their order of occurrence. The resulting pair of string sequences (S1,S2) are relatively short length strings.
4. The longest common subsequence (LCS) of (S1, S2) is found using a standard dynamic programming algorithm as given in Introduction to Algorithms by Cormen, Leisersen and Rivest.
5. If there are many LCS, select the appropriate LCS. This can be done either manually or automatically. In the automatic method, successive refinement step (see step 6) can be used to prune possible LCS until the most dominant one is retained.
6. Refine the estimate of text genre for each successive training document, by repeating steps 2–5 with the current text genre and the new training document. With each additional training document, the size of the LCS either remains the same or can become smaller. The resulting LCS after training with a sufficient number of training samples forms the representation of the text genre of the collection.

The extraction of strings in the document is done using the grammar given above on the document (OCRed after scanning or ASCII document). That is, words are first detected, then words separated by blanks or new lines are assembled until a sentence delimiter is found. The above method can be implemented in polynomial time taking O(mn) time per training document for forming the text genre. This incremental way of generating the text genre assumes that only samples belonging to the text genre are supplied during the training stage by the user, which is a reasonable assumption. For arbitrary document collection, this method does not guarantee that the text genre obtained is an LCS of the entire set of string sequences.

Document matching by text genre

The method used for generation of text genre from a training collection is also used to determine if a chosen query document belongs to a given text genre. Thus given a collection of documents which are represented through a text genre, it can be determined if a given query document belongs to the same text genre and hence the same document collection. This is done by the following processing steps:

1. Strings are extracted from the query document.
2. The strings of the text genre (LCS) of the existing collection are checked for matches in the given document (string matching done is using agrep for approximate matching with substitution errors as described above).
3. The LCS of the resulting string sequence is taken with the string sequence of the text genre.
4. Match score=length of resulting LCS/length of text genre.
5. Retain as a match if the match score is above a certain threshold to conclude that the query document belongs to the same text category of the given collection.

EXAMPLES

Figure 3:
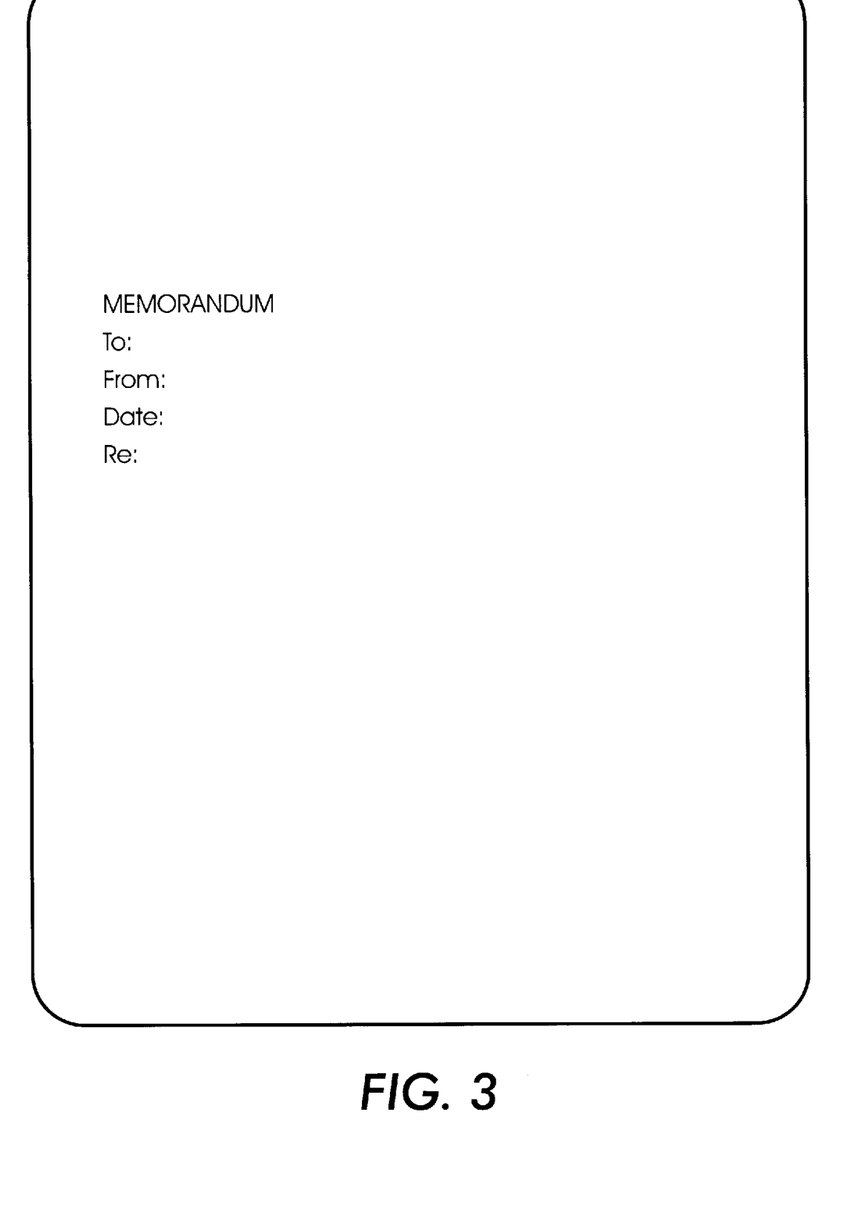
FIG. 3 shows the text genre of the collection depicted in FIGS. 1 and 2.

The generation of text genre and document matching by text genre is illustrated with a few examples. FIGS. 1 and 2 show sample documents of a training set. As can be seen, they all contain some common key strings that appear in the same order through all the documents. The resulting LCS generated forming the text genre of the collection is shown in FIG. 3. As can be seen, the LCS resembles the set of common strings found visually. The text genre in this case was obtained using the scanned versions of the text documents depicted in FIGS. 1 and 2. The OCR results although not shown here, contributed to some errors in character recognition in these examples. For example, in document of FIG. 2, the word MEMORANDUM was parsed as MEXORANDUM, while it was parsed as the word MEMO-RANDUM on the document of FIG. 1. Since the OCR errors are taken into account during the text genre generation process, and X and M are in a confusion class, the word MEMORANDUM shows in the text genre. Further, it can be seen that for these type of documents, the text genre is a compact representation of the commonality between the documents of the collection, even though the subject matter is quite different between the documents. It may also be noted that the LCS of the two documents shown in FIGS. 1 and 2 is longer than the text genre shown in FIG. 3. For example, the word "for" appears after RE: in both the documents. But it does not appear in the text genre, due to the refinement process described earlier, in which text strings that are not common to all the documents are removed. Finally, it can be seen that the text genre not only captures the common strings in the document but also their spatial order of occurrence, hence capturing spatial structure to some extent. However, since precise spatial layout information is not captured, the matching using such a representation can span more general representation of documents that are not constrained to a specific format for layout.

Figure 4:
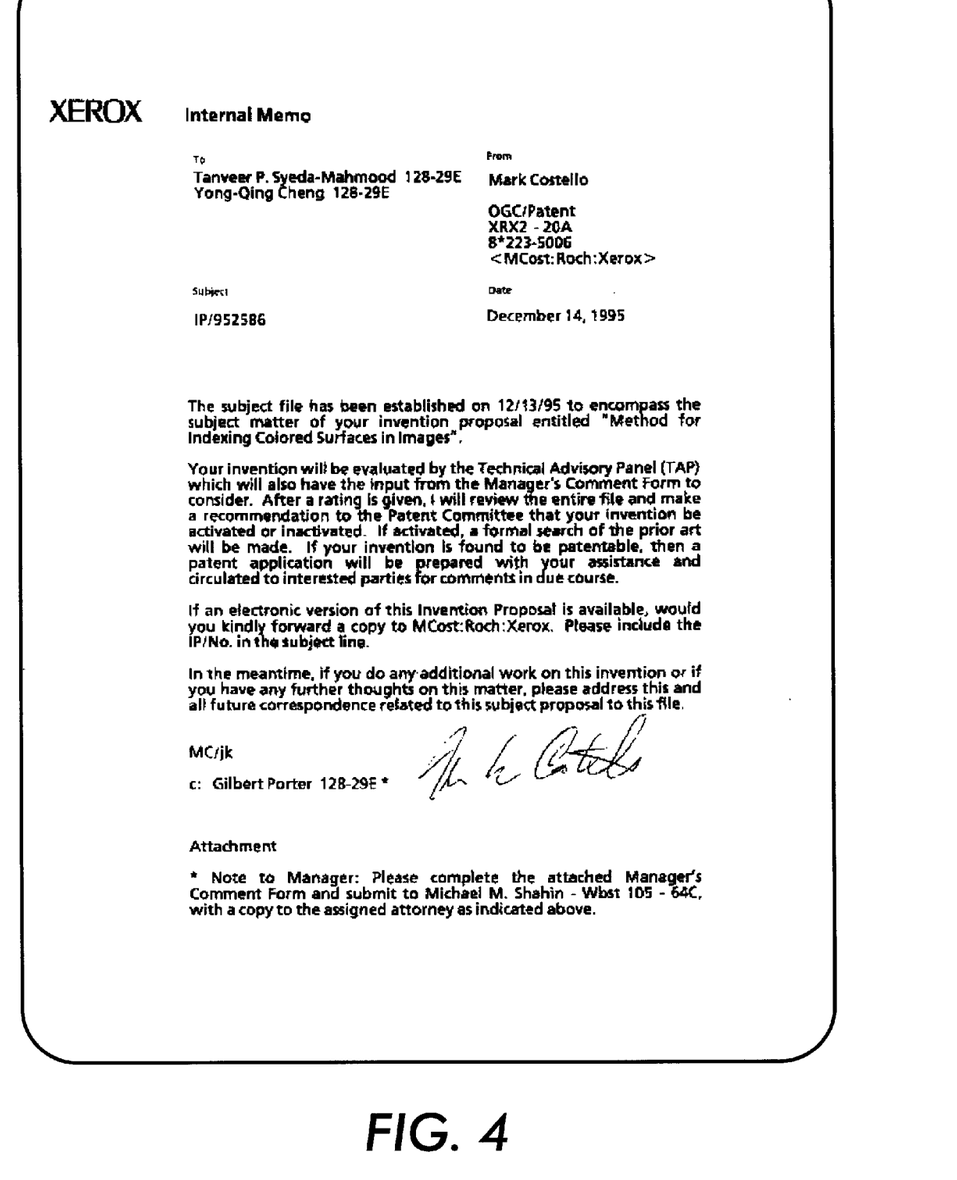
FIG. 4 shows a sample document query for matching by text genre.
Figure 5:
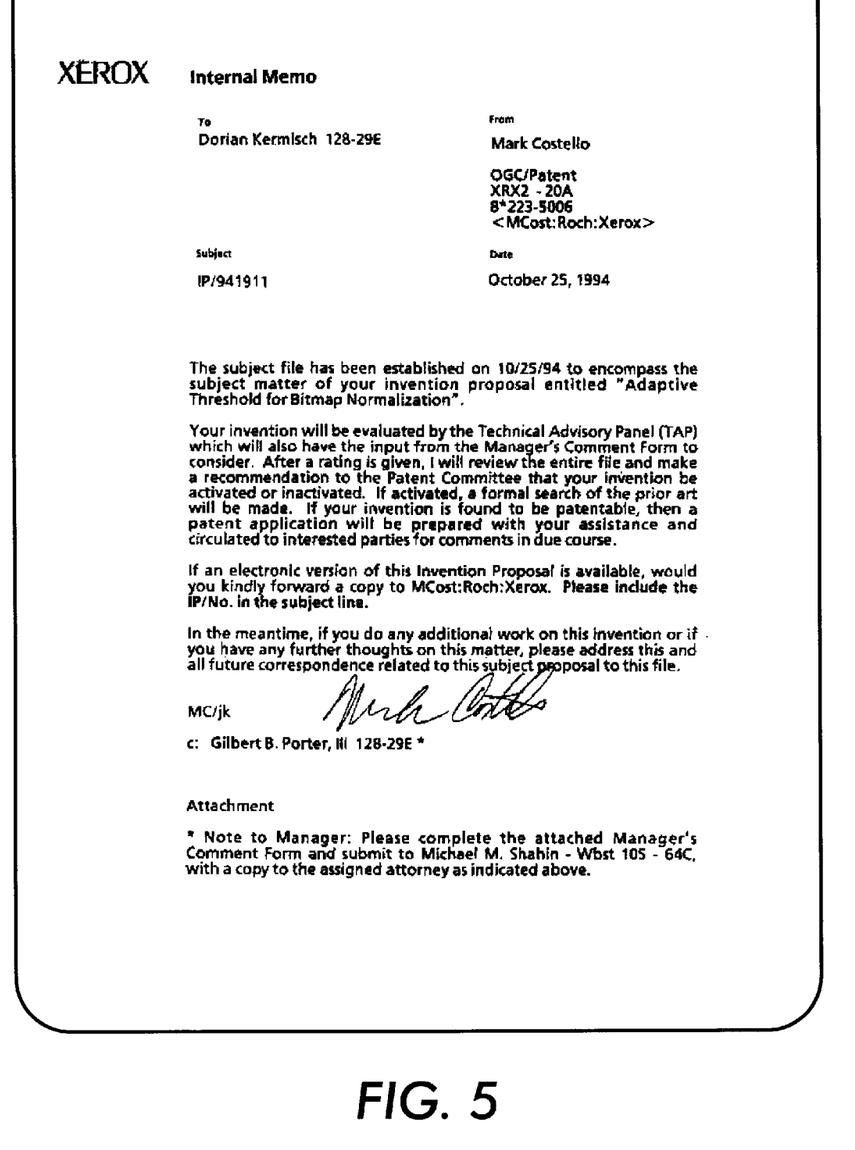
FIGS. 5, 6, and 7 show representative documents of three types of document collections.
Figure 6:
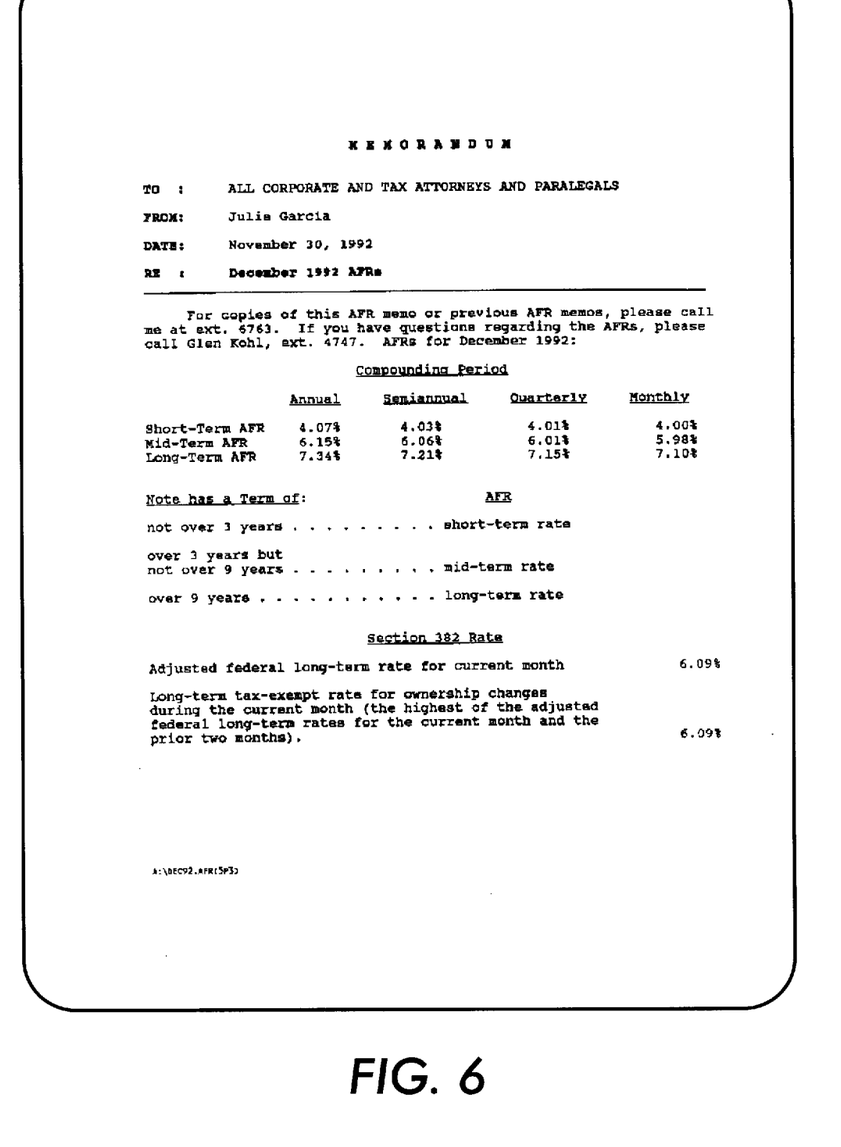
Figure 7:
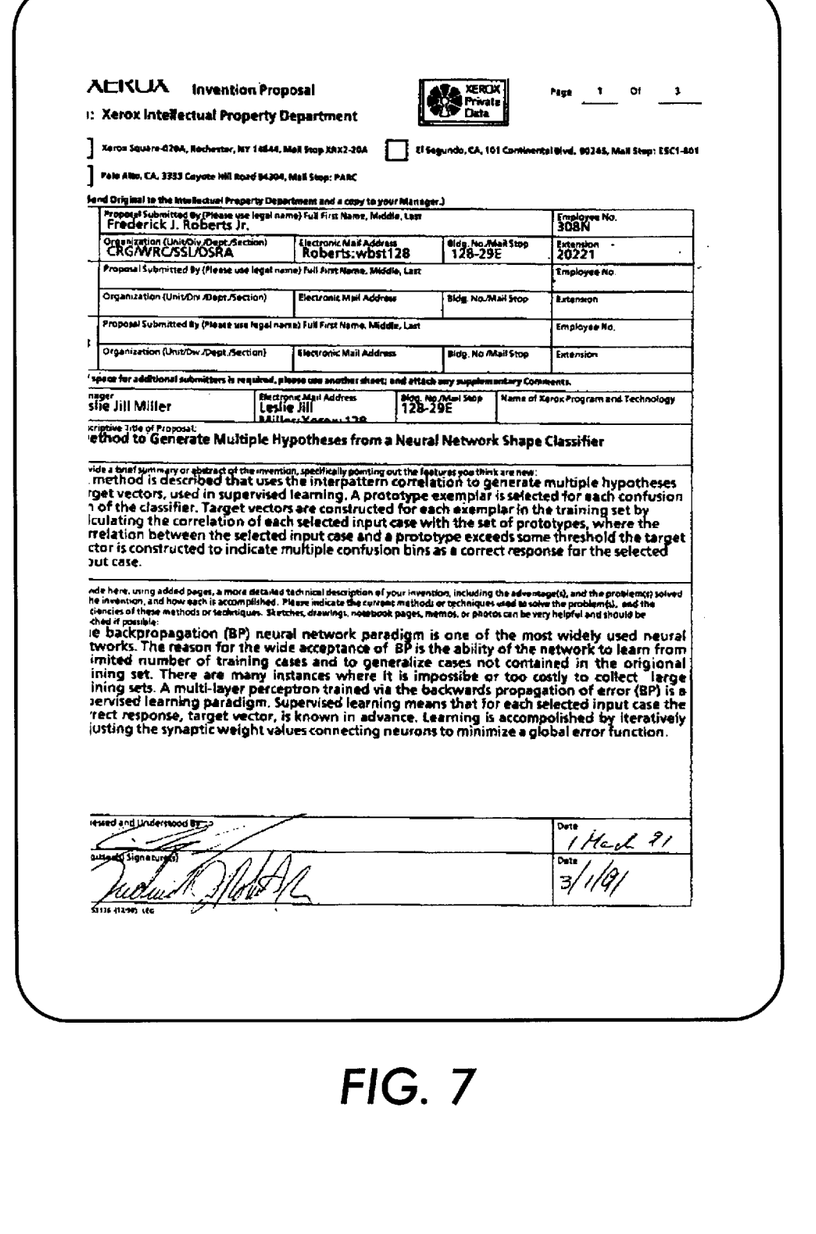
Figure 8:
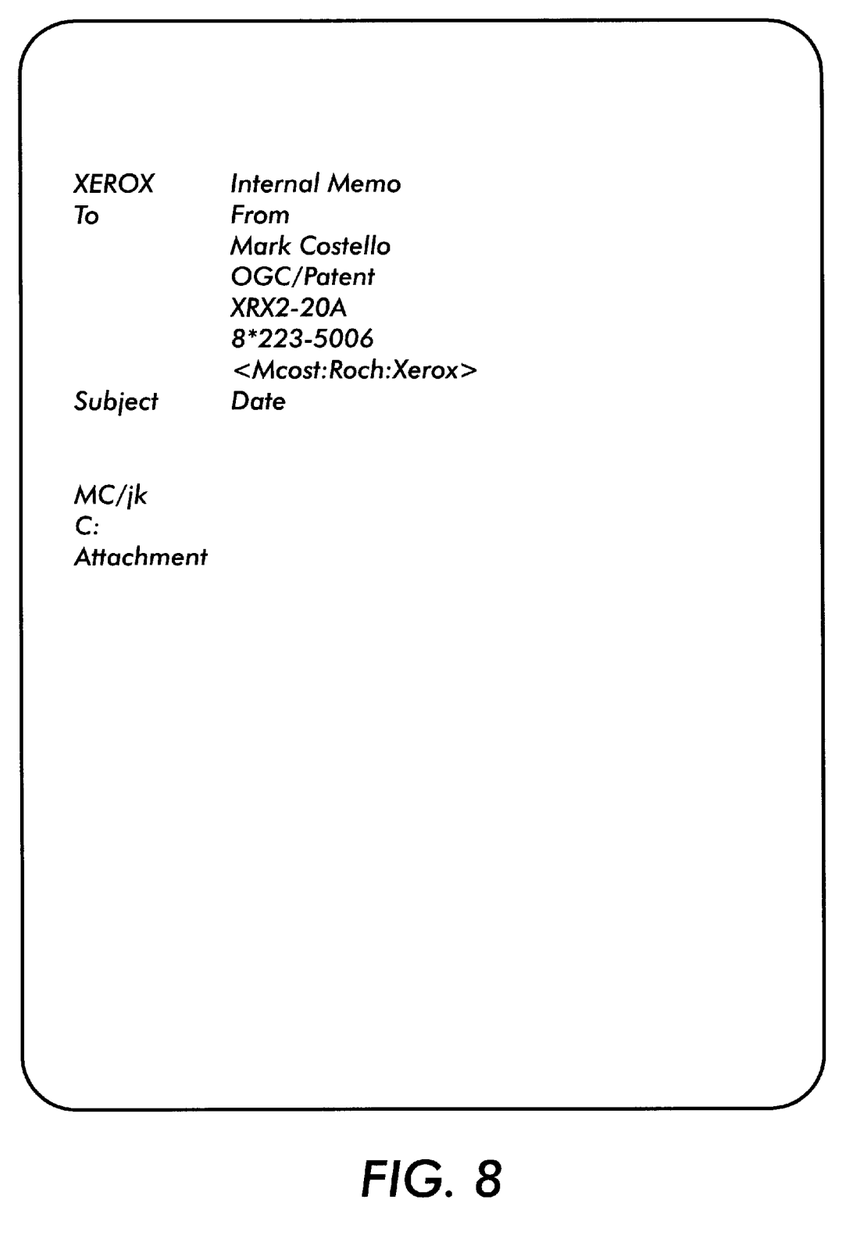
FIG. 8 shows the text genre of the collection represented by FIG. 5.
Figure 10:
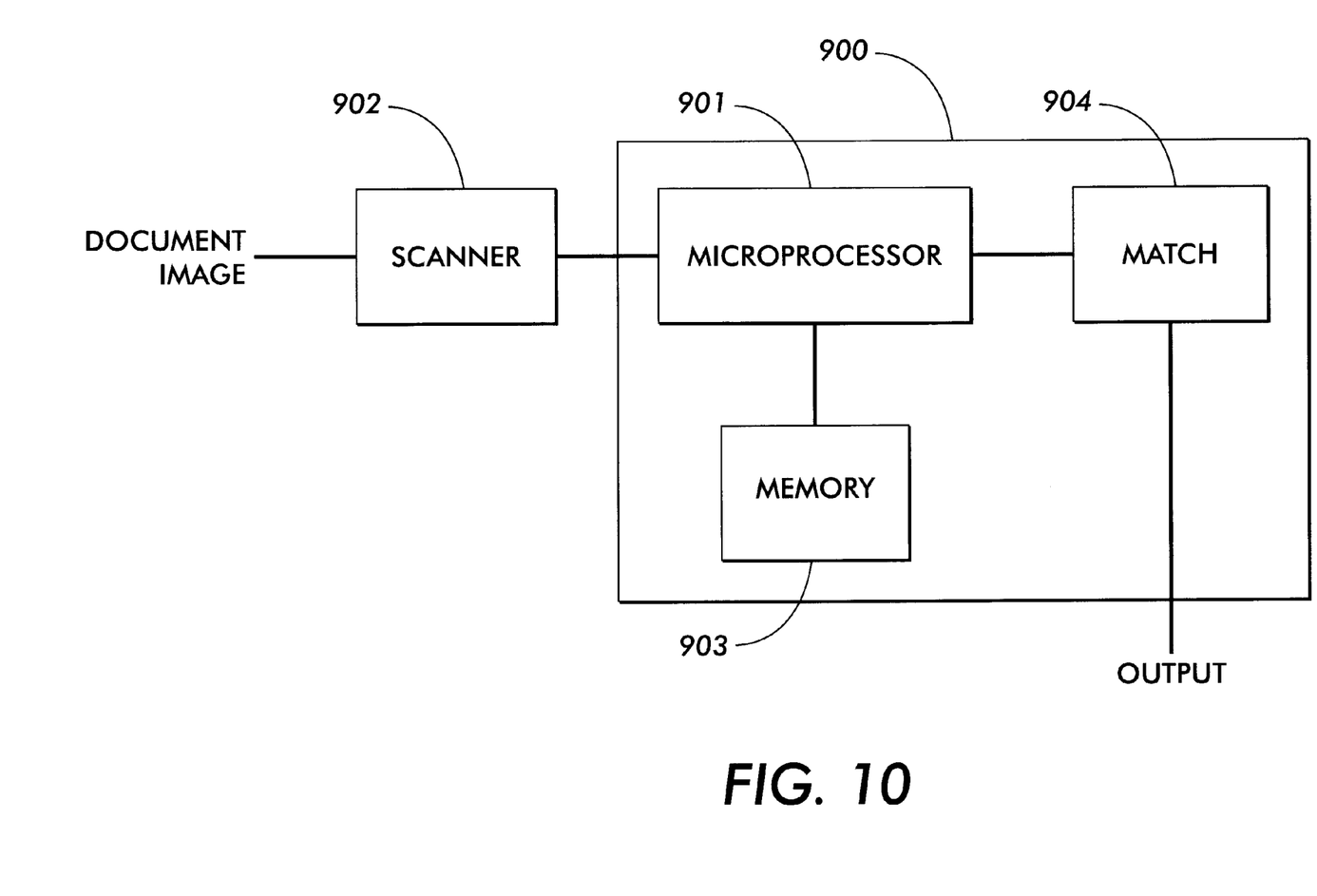
FIG. 10 is the block diagram of the inventive system.

Next, document matching by text genre is illustrated. FIGS. 5, 6, 7 show three documents belonging to three different text genres. The respective text genres are depicted in FIGS. 8, 3, and 9 respectively. These text genres are arrived from several training documents from the respective collection. A sample query document whose closest matching text genre is to be determined is shown in FIG. 4. Using the ratio of lengths of the LCS to the number of strings in the text genre (length of text genre) as the matching score, the scores after matching query document shown in FIG. 4 to the text genres of the document collections represented by FIGS. 5, 6, 7 are respectively 0.875, 0.6, and 0.285, indicating that the best match of document in FIG. 4 is to the document in FIG. 5. As can be seen from the score, the category of the given document has been correctly determined, indicating the success of document matching by text genre.

The method of document matching by text genre can be a useful complement to existing methods for document matching based on text keywords or pixel-wise image content.

The invention can be carried out in a system 900 as illustrated in FIG. 1. A scanner 910 or other optical digitizing device would be utilized to capture documents. In the alternative, documents may be obtained electronically through a network (not shown). The scanner would provide input to a computer system where a microprocessor 901 would process the electronic document in accordance with the method described above. A memory 903 or database would provide information regarding document genre. A display or other means of indicating the a match 904 for documents is also provided. A user interface (not shown) would also be utilized for external control of the invention.

The foregoing description of the invention has been presented for purposes of illustration and to describe the best mode known for implementing of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

What is claimed is:

1. A computer implemented method of developing text genre from a collection of documents, the method comprising the steps of:
   (a) extracting at least one key string from one document;
   (b) extracting at least one key string from another document;
   (c) forming a sequence of matching strings therefrom which preserve reading order;
   (d) using a confusion class for each character of each extracted string;
   (e) finding the longest common subsequence of matching strings to form an initial estimate of text genre; and
   (f) repeating steps (b) to (e) until a definition of the text genre is developed that captures the spatial structure of key strings as an LCS (longest common sequence) of matching key string sequences.

* * * * *